United States Patent
Krivenok

(10) Patent No.: US 10,841,154 B1
(45) Date of Patent: Nov. 17, 2020

(54) SYSTEMS AND METHODS FOR NETWORK DISCOVERY FOR ZERO CONFIGURATION BASED-CLUSTERED SYSTEMS

(71) Applicant: EMC IP Holding Company, LLC, Hopkinton, MA (US)

(72) Inventor: Dmitry Vladimirovich Krivenok, St Petersburg (RU)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 16/661,161

(22) Filed: Oct. 23, 2019

(51) Int. Cl.
  *G06F 15/16* (2006.01)
  *H04L 12/24* (2006.01)
  *H04L 29/12* (2006.01)
  *H04L 29/06* (2006.01)

(52) U.S. Cl.
  CPC .......... *H04L 41/0806* (2013.01); *H04L 41/12* (2013.01); *H04L 61/2007* (2013.01); *H04L 61/2046* (2013.01); *H04L 61/6086* (2013.01); *H04L 63/166* (2013.01)

(58) Field of Classification Search
  CPC .. H04L 41/12; H04L 61/2046; H04L 61/6086
  See application file for complete search history.

(56) References Cited

U.S. PATENT DOCUMENTS

| | | | | |
|---|---|---|---|---|
| 2014/0159923 | A1* | 6/2014 | Koodli | G08G 1/0129 340/905 |
| 2014/0328343 | A1* | 11/2014 | Kapadia | H04L 45/741 370/392 |
| 2015/0271620 | A1* | 9/2015 | Lando | H04S 5/005 381/18 |
| 2016/0028587 | A1* | 1/2016 | Garg | H04L 67/1002 709/224 |
| 2018/0167271 | A1* | 6/2018 | Bower, III | H04L 41/0886 |
| 2020/0136909 | A1* | 4/2020 | Eaton | H04L 41/0889 |

* cited by examiner

*Primary Examiner* — Hieu T Hoang
(74) *Attorney, Agent, or Firm* — Brian J. Colandreo; Mark H. Whittenberger; Holland & Knight LLP

(57) ABSTRACT

Embodiments included herein may be configured for supplementary network discovery of one or more zero-configuration-based clustered systems. Embodiments may include providing, via one or more client machines, at least a first cluster node and a second cluster node. Each of the first cluster node and the second cluster node may include at least one of a link-local internet protocol (IP) address, a primary cluster and a secondary cluster. One or more floating link-local IP addresses may be included within the secondary cluster. A discovery host configured to be connected to the local-area network may be provided. The first cluster node and the second cluster node may be configured concurrently. An IP address conflict between one or more of the link-local IP address of the first cluster, the link-local IP address of the second cluster, and the one or more floating link-local IP addresses of the secondary cluster may be detected.

20 Claims, 12 Drawing Sheets

SYSTEMS AND METHODS FOR NETWORK DISCOVERY FOR ZERO CONFIGURATION BASED-CLUSTERED SYSTEMS

RELATED APPLICATION

This application claims priority from Russian Patent Application Number 2019113321, filed on 30 Apr. 2019, at the Patent Office of the Russian Federation, Russia, entitled "SYSTEMS AND METHODS FOR NETWORK DISCOVERY FOR ZERO CONFIGURATION-BASED CLUSTERED SYSTEMS," the entire contents of which are hereby incorporated by reference.

TECHNICAL FIELD

This disclosure relates to network discovery, and, more particularly, to systems and methods for a supplementary network discovery mechanism for zero configuration-based systems.

BACKGROUND

In the use of zero-configuration (hereinafter "Zeroconf")-based network discovery of enterprise-class clustered systems such as federated storage, HCI clusters and more, many corporate IT environments have proven unfriendly to Zeroconf on a client's side. As a result, the Zeroconf-based network discovery requires a great deal of non-standard manual configuration before the desired seamless and Zeroconf user experience may be achieved. For example, non-standard software may have to be installed, critical system software may have to be disabled, firewall rules may have to be modified, network adapters on multi-homed machines may have to be disabled, artificial network segregation may be needed, and more.

More generally, in the discovery of unconfigured hosts on a network, there are currently several approaches known. First, a predefined well-known internet protocol ("IP") address may be configured on a host. The benefit of this approach is that it is far simpler and may not require any non-standard configuration or additional tools on the client side. However, this approach also has several disadvantages. First, the approach is not clustering aware, it is usually impossible to discover multiple hosts in the same network at the same time because an identical discovery IP address is used, and even access to a single host may be disrupted due to address conflicts. Second, it is possible to artificially segregate the hosts (e.g., place them into different networks or virtual local-area networks (VLANs)) to configure them individually, but it is still not possible to cluster them together. Third, predefined well-known IP address schemes usually do not have any protection against address conflicts in the target network environment. If some other host already uses the same address, the discovery will likely not work or, even worse, connectivity to existing hosts may be disrupted. Additionally, for a seamless experience, a user needs to manually configure two IP addresses on the client hosts beforehand—one to discover the system and another one to access it after a permanent network configuration is assigned. This may be impossible to do in some scenarios when IP addresses belong to different VLANs, but the discovery machine is connected to the access port and is not able to handle tagged traffic itself. Lastly, often only Internet Protocol version 4 ("IPv4") predefined addresses are configured, which makes it hard to perform discovery from Internet Protocol version 6 ("IPv6")-only hosts.

An additional approach to discovery of unconfigured hosts on a network includes the development of proprietary network discovery protocols and dedicated tools. However, this approach also has a number of downsides. For example, additional development and maintenance costs may be associated with proprietary protocol development. Further, such tools often require administrator-level permissions because they need to bypass normal operating system application programming interfaces (OS APIs) and use low-level APIs to deal with non-standard network discovery on the client side. Lastly, the discovery tool must be developed and qualified for each OS from where network discovery is supposed to be initiated.

Further, standards-based network discovery solutions exist as an approach to discovery of unconfigured hosts on a network. These solutions may be based on technologies like Zeroconf (link-local automatic addresses, multicast domain name system ("mDNS"), and domain name system service discovery ("DNS-SD")) and universal plug and play/simple service discovery protocol ("UPnP/SSDP") (link-local automatic addresses and HTTPU). While these technologies usually work fine in small environments like home networks, they may have issues in large enterprise networks. Further, in this solution, there is often a lack of predictable behavior on multi-homed client hosts (e.g. a laptop with wired and wireless interfaces). Additionally, there may be incompatibility with dynamic host configuration protocol ("DHCP")-enabled environments when a client OS combines DHCP-based automatic address configuration and link-local addresses and the server side does not support DHCP by design. Lastly, non-standard client OS configuration tuning may be needed, especially in corporate networks. This may include firewall exception rules (e.g. for multicast-based mDNS traffic), disablement of some critical software like network managers and antiviruses, etc. This approach generally requires special software not usually available on client machines (e.g. mDNS capable browsers).

SUMMARY

In an embodiment of the present disclosure, a computer-implemented method for supplementary network discovery of one or more zero-configuration-based clustered systems is provided. The method may include providing, via one or more client machines, at least a first cluster node and a second cluster node. The first cluster node and the second cluster node may be configured to be connected to a local-area network. Each of the first cluster node and the second cluster node may be comprised of at least one of a link-local internet protocol (IP) address, a primary cluster and a secondary cluster. The method may further involve including one or more floating link-local IP addresses within the secondary cluster. The one or more link-local IP addresses may allow a user to access the secondary cluster. A discovery host configured to be connected to the local-area network may be provided, via one or more client machines. The discovery host may include at least a web browser. The discovery host may be configured to communicate with the first cluster node and the second cluster node via a unicast communication without requiring a zero-configuration service discovery stack. The first cluster node and the second cluster node may be configured concurrently. Configuring the first cluster node and the second cluster node concurrently may not require artificial segregation of the first cluster node from the second cluster node. An IP address conflict between one or more of the link-local IP address of the first cluster, the link-local IP address of the second cluster, and the one or more floating link-local IP addresses of the secondary cluster may be detected.

One or more of the following features may be included. One or more link-local IP addresses may be assigned to one or more of the first cluster and the second cluster. Assigning one or more link-local IP addresses may minimize the risk of an IP address conflict. One or more client machines may include one or more of a single-stack client machine and a dual-stack client machine. One or more client machines may include a multi-homed client machine. The first cluster node and the second cluster node may be discovered via one or more of an IPv4 and an IPv6 link-local discovery address. The first cluster node and the second cluster node may be discovered using one or more IPv6 ULA discovery addresses. The local-area network may be comprised of a network configuration that does not require one or more of customization of an operating system and disablement of system software.

In another embodiment of the present disclosure, a computing system including a processor and a memory system may be configured to perform operations including providing, via one or more client machines, at least a first cluster node and a second cluster node. The first cluster node and the second cluster node may be configured to be connected to a local-area network. Each of the first cluster node and the second cluster node may be comprised of at least one of a link-local internet protocol (IP) address, a primary cluster and a secondary cluster. The method may further involve including one or more floating link-local IP addresses within the secondary cluster. The one or more floating link-local IP addresses may allow a user to access the secondary cluster. A discovery host configured to be connected to the local-area network may be provided, via one or more client machines. The discovery host may include at least a web browser. The discovery host may be configured to communicate with the first cluster node and the second cluster node via a unicast communication without requiring a zero-configuration service discovery stack. The first cluster node and the second cluster node may be configured concurrently. Configuring the first cluster node and the second cluster node concurrently may not require artificial segregation of the first cluster node from the second cluster node. An IP address conflict between one or more of the link-local IP address of the first cluster, the link-local IP address of the second cluster, and the one or more floating link-local IP addresses of the secondary cluster may be detected.

One or more of the following features may be included. One or more link-local IP addresses may be assigned to one or more of the first cluster and the second cluster. Assigning one or more link-local IP addresses may minimize the risk of an IP address conflict. One or more client machines may include one or more of a single-stack client machine and a dual-stack client machine. One or more client machines may include a multi-homed client machine. The first cluster node and the second cluster node may be discovered via one or more of an IPv4 and an IPv6 link-local discovery address. The first cluster node and the second cluster node may be discovered using one or more IPv6 ULA discovery addresses. The local-area network may be comprised of a network configuration that does not require one or more of customization of an operating system and disablement of system software.

In another embodiment of the present disclosure, a computer-implemented product comprising a non-transitory computer readable storage medium having plurality of instructions stored thereon, which, when executed by a processor, may cause the processor to perform operations including providing, via one or more client machines, at least a first cluster node and a second cluster node. The first cluster node and the second cluster node may be configured to be connected to a local-area network. Each of the first cluster node and the second cluster node may be comprised of at least one of a link-local internet protocol (IP) address, a primary cluster and a secondary cluster. Operations may further involve including one or more floating link-local IP addresses within the secondary cluster. The one or more link-local IP addresses may allow a user to access the secondary cluster. A discovery host configured to be connected to the local-area network may be provided, via one or more client machines. The discovery host may include at least a web browser. The discovery host may be configured to communicate with the first cluster node and the second cluster node via a unicast communication without requiring a zero-configuration service discovery stack. The first cluster node and the second cluster node may be configured concurrently. Configuring the first cluster node and the second cluster node concurrently may not require artificial segregation of the first cluster node from the second cluster node. An IP address conflict between one or more of the link-local IP address of the first cluster, the link-local IP address of the second cluster, and the one or more floating link-local IP addresses of the secondary cluster may be detected.

One or more of the following features may be included. One or more link-local IP addresses may be assigned to one or more of the first cluster and the second cluster. Assigning one or more link-local IP addresses may minimize the risk of an IP address conflict. One or more client machines may include one or more of a single-stack client machine and a dual-stack client machine. One or more client machines may include a multi-homed client machine. The first cluster node and the second cluster node may be discovered via one or more of an IPv4 and an IPv6 link-local discovery address. The first cluster node and the second cluster node may be discovered using one or more IPv6 ULA discovery addresses. The local-area network may be comprised of a network configuration that does not require one or more of customization of an operating system and disablement of system software.

The details of one or more example embodiments are set forth in the accompanying drawings and the description below. Other possible example features and/or possible example advantages will become apparent from the description, the drawings, and the claims. Some embodiments may not have those possible example features and/or possible example advantages, and such possible example features and/or possible example advantages may not necessarily be required of some embodiments.

BRIEF DESCRIPTION OF THE DRAWINGS

Like reference symbols in the various drawings may indicate like elements.

DETAILED DESCRIPTION

Embodiments of the present disclosure are directed towards a supplementary network discovery mechanism for Zeroconf-based clustered systems. In some embodiments, the teachings of the present disclosure introduces a new method for a supplementary network discovery mechanism for Zeroconf-based clustered systems.

Figure 1:
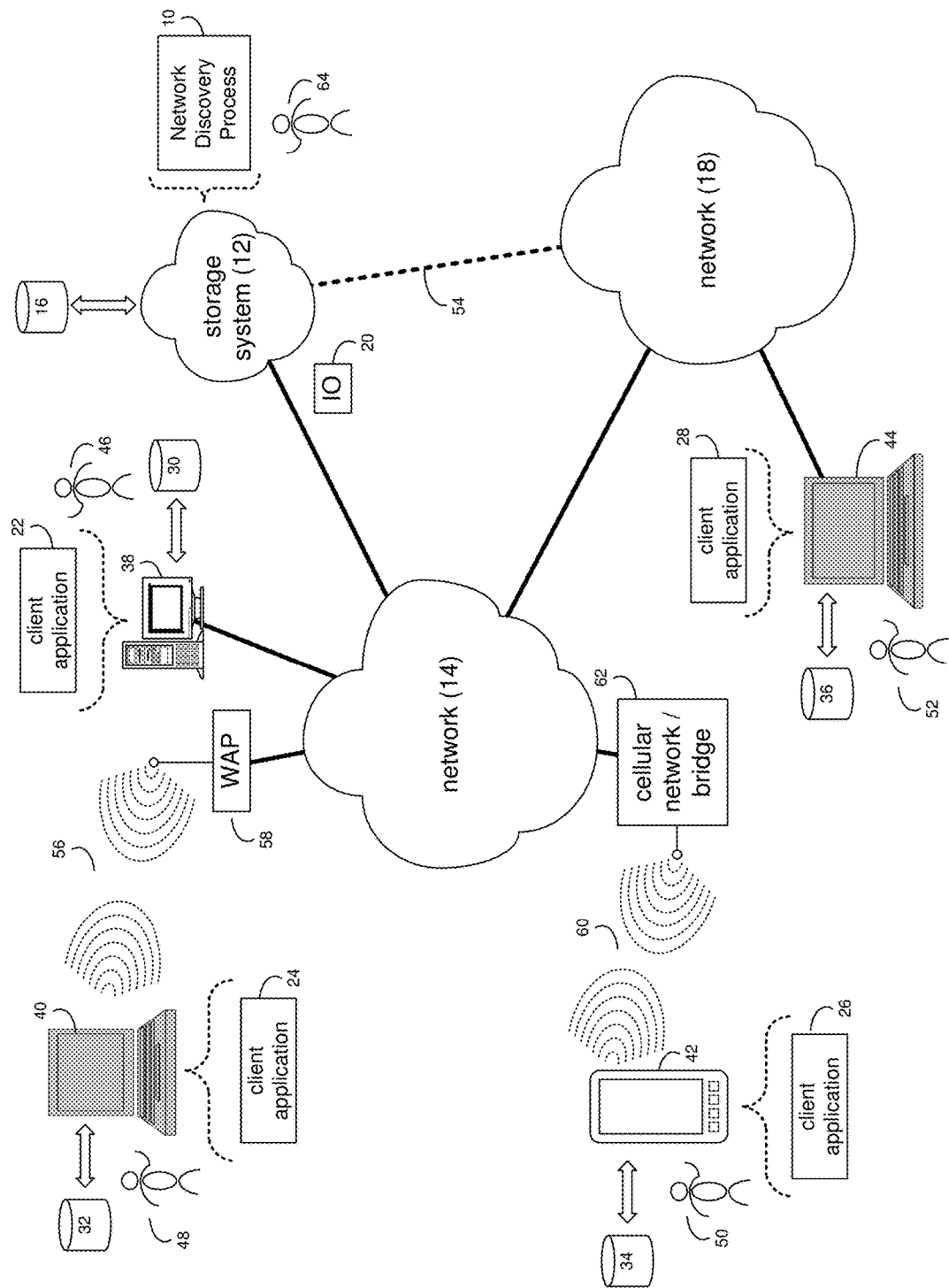
FIG. 1 is diagram depicting an embodiment of a network discovery system in accordance with the present disclosure.

Referring to FIG. 1, there is shown a supplementary network discovery mechanism process 10 (hereinafter "network discovery process 10") for Zeroconf-based clustered systems that may reside on and may be executed by storage system 12, which may be connected to network 14 (e.g., the Internet or a local area network). Examples of storage system 12 may include, but are not limited to, high-availability storage systems such as: a Network Attached Storage (NAS) system, a Storage Area Network (SAN), a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of network discovery process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
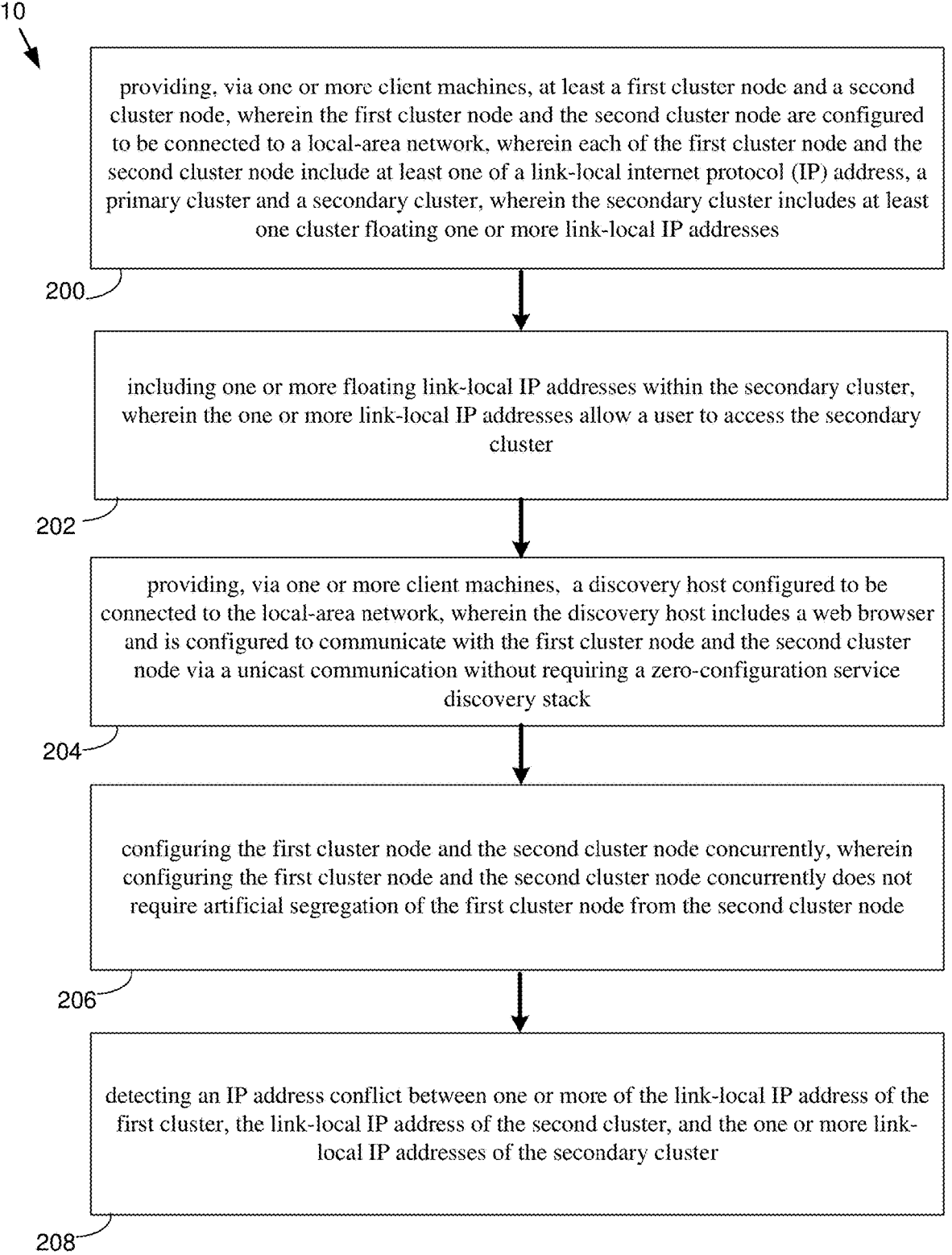
FIG. 2 is a flow chart of a network discovery system, in accordance with an embodiment of the present disclosure.

Referring now to FIG. 2, a flowchart depicting examples of operations that may be used in accordance with network discovery process 10 is provided. Operations may include providing (200), via one or more client machines, at least a first cluster node and a second cluster node, wherein the first cluster node and the second cluster node are configured to be connected to a local-area network. Each of the first cluster node and the second cluster node may include at least one of a link-local internet protocol (IP) address, a primary cluster and a secondary cluster. The method may also comprise including (202) one or more floating link-local IP addresses within the secondary cluster, wherein the one or more floating link-local IP addresses allow a user to access the secondary cluster. The method may further include providing (204), via one or more client machines, a discovery host configured to be connected to the local-area network, wherein the discovery host includes a web browser and is configured to communicate with the first cluster node and the second cluster node via a unicast communication without requiring a zero-configuration service discovery stack. The method may also include configuring (206) the first cluster node and the second cluster node concurrently, wherein configuring the first cluster node and the second cluster node concurrently does not require artificial segregation of the first cluster node from the second cluster node. The method may additionally include detecting (208) an IP address conflict between one or more of the link-local IP address of the first cluster, the link-local IP address of the second cluster, and the one or more floating link-local IP addresses of the secondary cluster. Numerous other operations are also within the scope of the present disclosure. For example, N number of cluster nodes may be included. Specifically, a third cluster node may be included. Additionally, a fourth cluster node may be included.

Further, in a clustered system based on Zeroconf technologies, communication between unconfigured nodes of a cluster may occur over an automatically configured link-local network, for example in an IPv4 link-local subnet 169.254.0.0/16 or IPv6 link-local subnet fe80::/64. In this particular example, before the cluster may be created, the unconfigured nodes may need to be discovered on the network. Since such clustered systems have no predefined addresses, the only way to discover them may be via a form of service discovery, e.g. DNS-SD over mDNS. This assumes that the client machine from which the initial discovery may be performed has to be connected to the same LAN, should have link-local IP addresses and corresponding service discovery stack.

Figure 3:
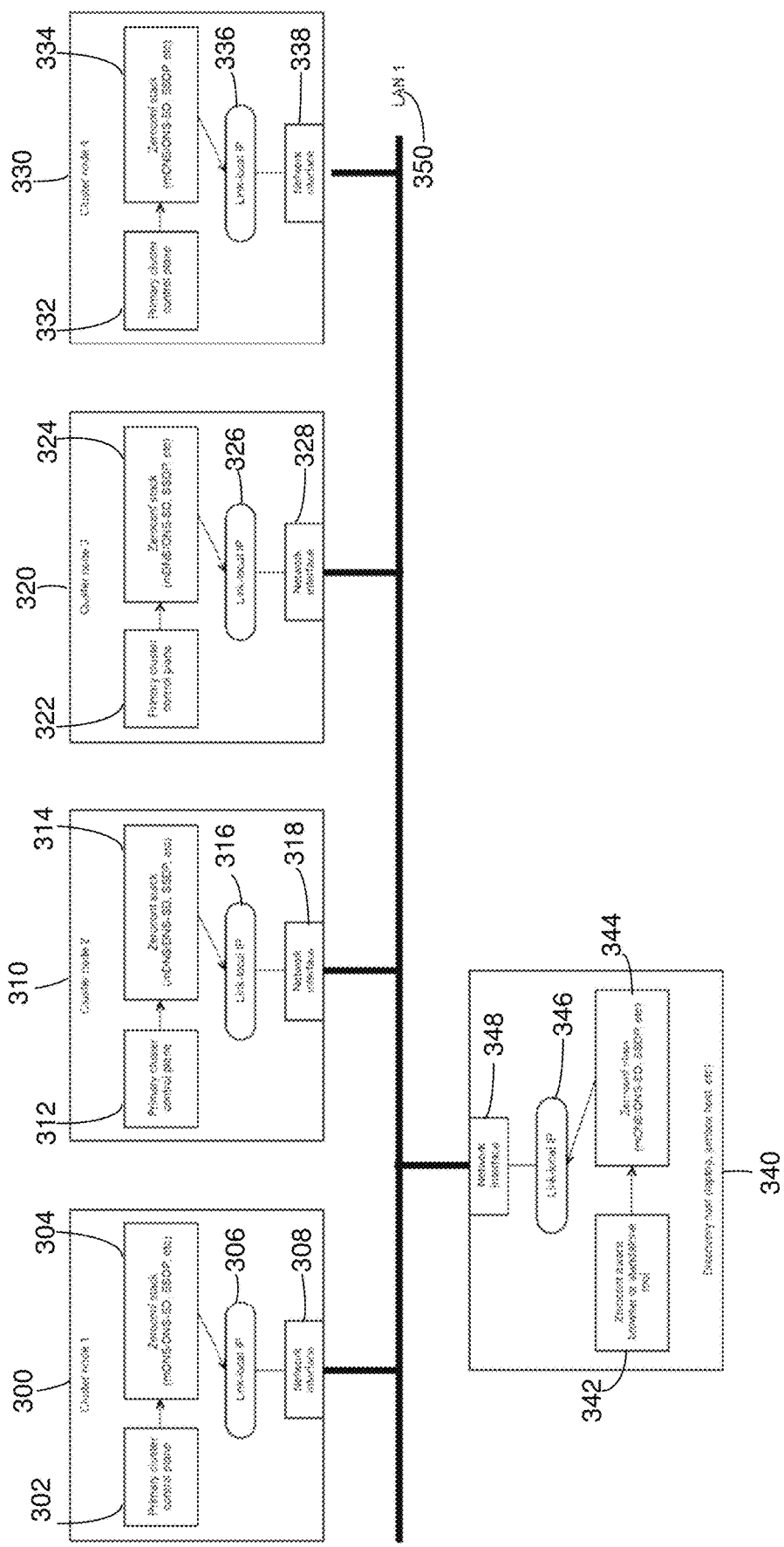
FIG. 3 is a block diagram of a network discovery system, in accordance with an embodiment of the present disclosure.

Referring now to FIG. 3, an embodiment illustrating an example of a number of unconfigured cluster nodes (i.e., cluster nodes 300, 310, 320, 330) and a client machine connected to the same LAN (i.e, LAN 1 350). Lan 350 may be comprised of a network configuration that does not require one or more of customization of an operating system and disablement of system software. The cluster nodes each may include a primary cluster control plane (i.e. 302, 312, 322, 332) that may be connected to a Zeroconf stack (i.e. 304, 314, 324, 334). The Zeroconf stack (i.e. 304, 314, 324, 334) may feature mDNS/DNS-SD, SSDP, etc. and may be connected to a link-local IP (i.e. 306, 316, 326, 336), which, in turn, may be connected to a network interface (i.e. 308, 318, 328, 338). Further, discovery host 340 (i.e a client machine in the form of a laptop, jumbox host, etc.) may be included, which may have a Zeroconf aware browser or standalone tool 342, which may be connected to Zeroconf stack 344, which may feature mDNS/DNS-SD, SSDP, etc. Zeroconf stack 344 may be connected to link-local IP 346, which may in turn be connected to network interface 348. In this particular example, a user may discover all available nodes, access one of them via the resolved link-local IP address and in the UI of the system select other nodes to be clustered together. The user may configure a cluster consisting of one discovered node, all discovered node or any subset of the nodes.

Figure 4:
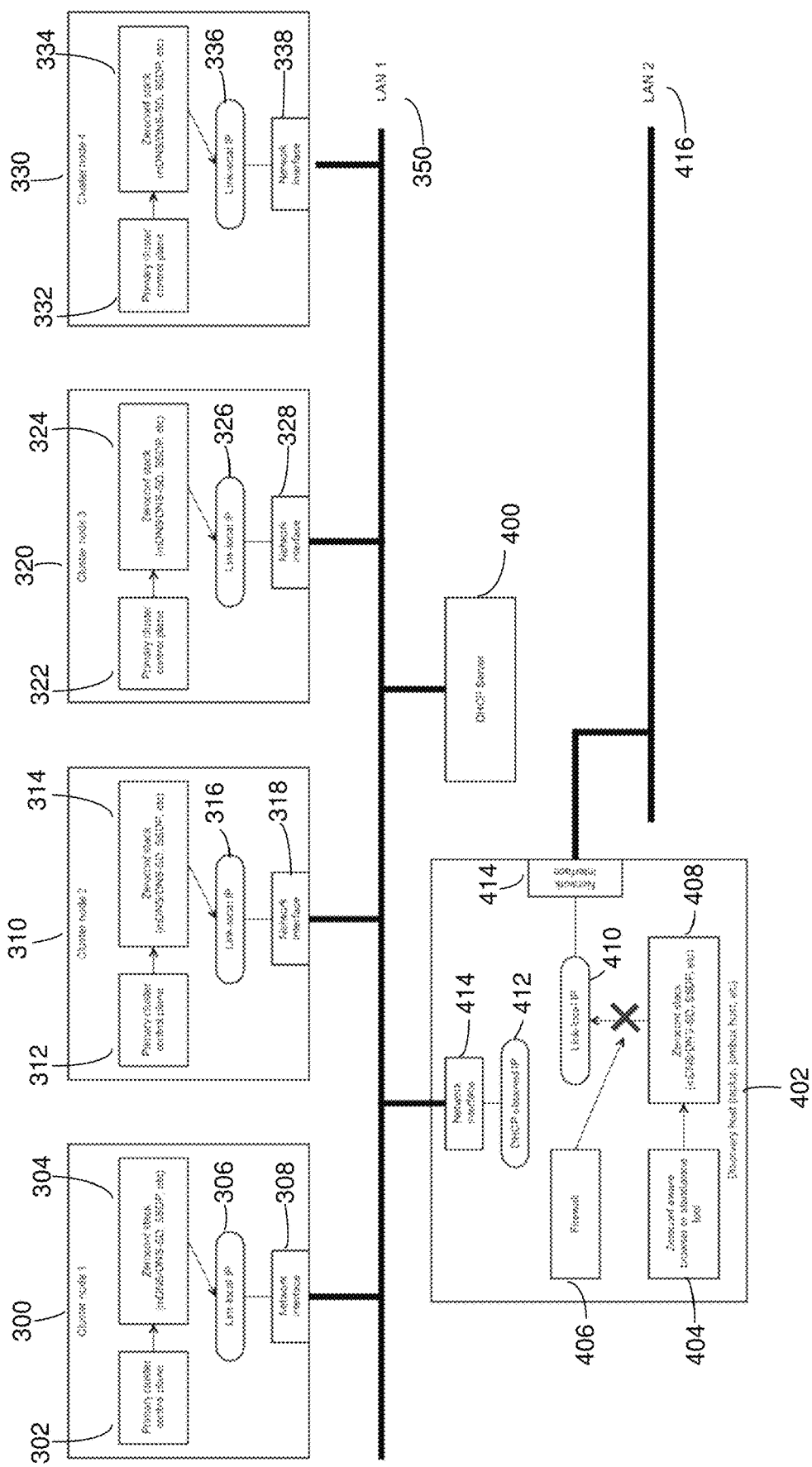
FIG. 4 is a block diagram of a network discovery system, in accordance with an embodiment of the present disclosure.

Referring now to FIG. 4, an example illustrating a potential problem that may cause Zeroconf stacks to be incompatible with corporate client machines connected to large enterprise networks is provided. This example shows the use of a multi-homed client machine (i.e. hosts that have multiple network interfaces connected to different networks). Similar to the embodiment shown in FIG. 3, cluster nodes 300, 310, 320, and 330 may include a primary cluster control plane (i.e. 302, 312, 322, 332) that may be connected to a Zeroconf stack (i.e. 304, 314, 324, 334), which may feature mDNS/DNS-SD, SSDP, etc., that may be connected to a link-local IP (i.e. 306, 316, 326, 336), which, in turn, may be connected to a network interface (i.e. 308, 318, 328, 338). A DHCP server 400, may be located between cluster node 310 and cluster node 320. In some embodiments, DHCP may be enabled on the client slide. Discovery host 402 (i.e. a laptop, jumbox host, etc.) may also be connected to LAN 1 350. Discovery host 402 may include a Zeroconf aware browser or standalone tool 404, which may be connected to Zeroconf stack 408, which may feature mDNS/DNS-SD, SSDP, etc. While Zeroconf stack 408 may attempt to connect to link-local IP 410, firewall 406 may prevent the connection. Link-local 410 may be connected to network interface 414, which may be connected to LAN 2 (416) in return. Further, discovery host 402 may include network interface 414, which may be connected to DHCP obtained IP 412.

As FIG. 4 demonstrates, a potential problem with Zeroconf based discovery of cluster nodes may be that client-side configuration is not controlled by a vendor of the clustered system in any way. As such, network discovery process 10 seeks to remove the requirement of Zeroconf stack on a client machine.

In this configuration, the behavior of the Zeroconf stacks may not be well-defined and/or there may be implementations that have different behavior. For example, a first network interface with a link-local IP address configured may be chosen. However, the wrong interface may be chosen and the cluster nodes may not be discovered. Additionally, service discovery may be conducted over all interfaces. This may lead to a problem where service records are returned N times if N interfaces are bridged externally. Further, the systems may not be capable of being clustered together if the interfaces are connected to different broadcast domains where a combined list of nodes may be returned to an end user. In this scenario, the broadcast domains may each include one or more unconfigured cluster nodes.

Another problem that may cause Zeroconf stacks to be incompatible with corporate client machines connected to large enterprise networks may be that some operating systems do not allow configuring automatic link-local IP addresses without enabling DHCP-based network configuration. In this configuration, the DHCP-based network configuration may have a higher priority than link-local IP addresses. For example, if a network where a client machine is connected to has a DHCP server, no link-local addresses may be configured. Further, if the cluster nodes do not support DHCP, the client may not be able to perform the discovery.

An additional problem that may cause Zeroconf stacks to be incompatible with corporate client machines connected to large enterprise networks may be that corporate OS configuration and/or installed software (i.e. network managers, antiviruses, firewalls, etc.) may block multicast mDNS packets or custom discovery tools. Altering the configuration of the OS or disabling the conflicting software may not be possible due to corporate security policies.

The problems described above that that may cause Zeroconf stacks to be incompatible with corporate client machines connected to large enterprise networks demonstrate how a user's experience with Zeroconf may not be seamless.

Figure 5:
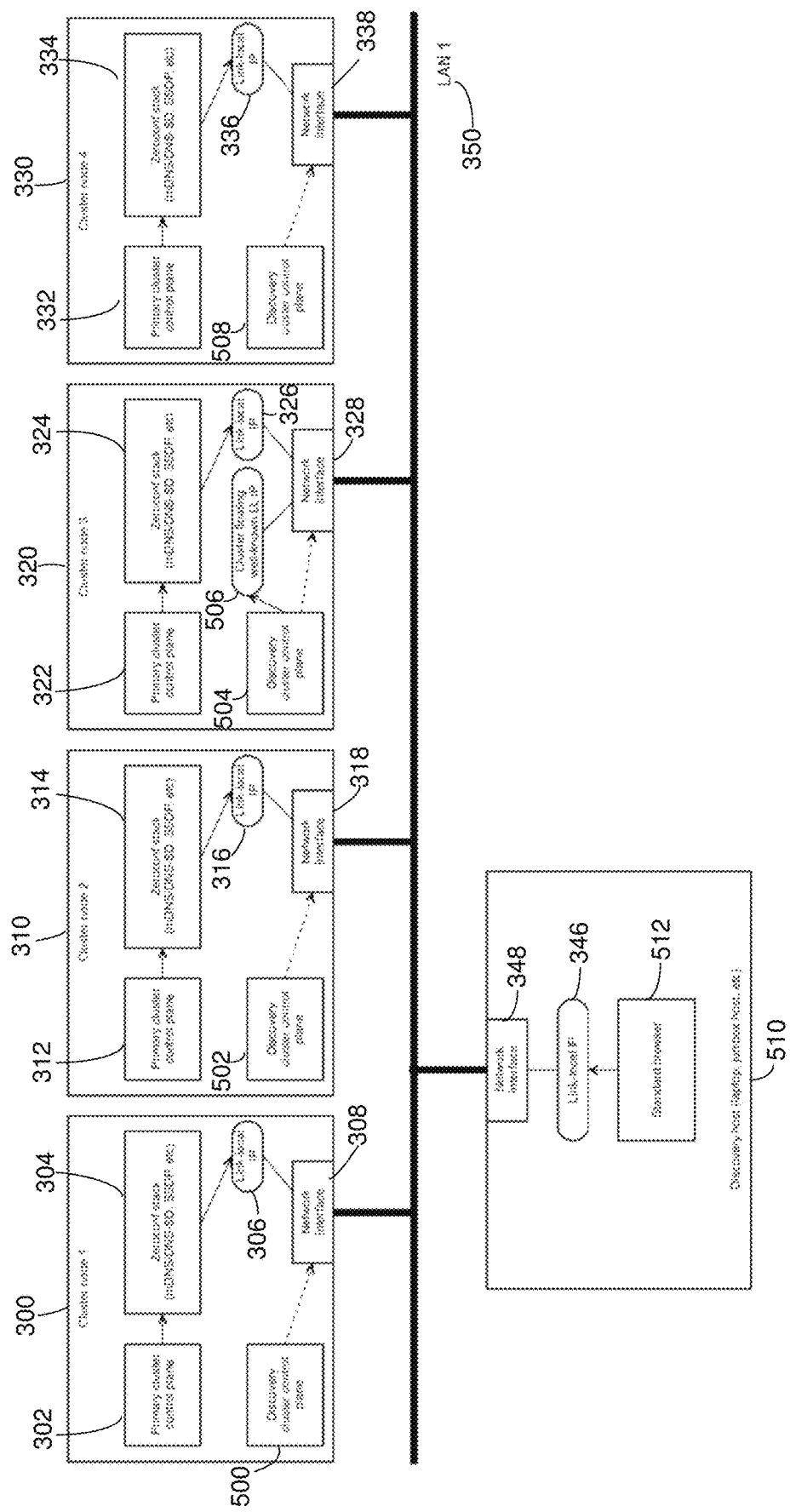
FIG. 5 is a block diagram of a network discovery system, in accordance with an embodiment of the present disclosure.

Referring to FIG. 5, a solution to the above described problems with Zeroconf stacks is shown, in accordance with an embodiment of the present disclosure. In operation, the primary cluster control plane (i.e. 302, 312, 322, 332) may be able to serve the discovery function while one or more cluster nodes (i.e. 300, 310, 320, 330) are in the process of joining the primary cluster control plane. In the event the primary cluster is not able support the primary cluster control plane serving the discovery function, then this solution may be extended with an intermediate "configuring"

state. The primary cluster control may notify the discovery cluster when the node moves from unconfigured to "configuring" state. The discovery cluster may be independent of the primary cluster. For simplicity, in the following examples and embodiments, it is assumed that cluster nodes have only two states: unconfigured and configured.

In some embodiments, and similar to the embodiment shown in FIG. 3, cluster nodes 300, 310, 320, and 330 may include a primary cluster control plane (i.e. 302, 312, 322, 332) that may be connected to a Zeroconf stack (i.e. 304, 314, 324, 334). The Zeroconf stack (i.e. 304, 314, 324, 334) may feature mDNS/DNS-SD, SSDP, etc. and may be connected to a link-local IP (i.e. 306, 316, 326, 336), which in turn may be connected to a network interface (i.e. 308, 318, 328, 338). The link-local IP address may be permanently assigned to one of the one or more cluster nodes 300, 310, 320, and 340. Further, a discovery cluster control plane (i.e. secondary discovery cluster 500, 502, 504, 508) may be included in cluster nodes 300, 310, 320, and 330 and may be connected to the network interface (i.e. 308, 318, 328, 338). In one or more of the cluster nodes, for example, cluster 320 for illustration purposes only, a cluster floating one or more well-known link-local IP addresses (i.e. cluster floating one or more well-known link-local IP addresses 506) is may be included and connected to a network interface (i.e. network interface 328). For example, the one or more well-known link-local IP addresses may be shared between two or more of the one or more cluster nodes 300, 310, 320, and 330. Therefore, the one or more well-known link-local IP addresses may be floated between at least two or more of the cluster nodes 300, 310, 320, and 330. For example, and not to be construed as a limitation, the one or more well-known link-local addresses associated with cluster node 300 may migrate to cluster node 310. Discovery host 510 may include a standard browser 512 connected to a link-local IP (i.e. link local IP 346), which, in turn, may be connected to a network interface (i.e. network interface 348). Discovery host 510 may also be connected to LAN 1 350.

Specifically, embodiments of the present disclosure may include removing a Zeroconf stack on a client's machine. Further, a secondary discovery cluster (i.e. 500, 502, 504, 508) may be included in a cluster node (i.e. 300, 310, 320, 330), which may operate independently on the same cluster nodes (i.e. 300, 310, 320, 330). The secondary discovery cluster (i.e. 500, 502, 504, 508) may not have to share a transport with the primary discovery cluster (i.e. 302, 312, 322, 332). The secondary discovery cluster (i.e. 500, 502, 504, 508) also may not have to share the same clustering decisions (i.e. master election logic, network partitioning handing, etc.) with the primary discovery cluster (i.e. 302, 312, 322, 332). Further, the secondary discovery cluster (i.e. 500, 502, 504, 508), may provide a single cluster floating well-known link-local IP addresses via which a user may access the cluster (i.e. cluster 300, 310, 320, 330). The software of the secondary discovery cluster (i.e. 500, 502, 504, 508) may support operations such as master election and reelection, handling of address conflicts, failover of the cluster IP address, etc. Using this approach, the need for multicast traffic, Zeroconf stack, and for Zeroconf-capable browser or tool on the client machine may be eliminated. Further, all communications with the unconfigured cluster nodes may occur over a unicast link-local IP address using any standard browser.

Figure 6A:
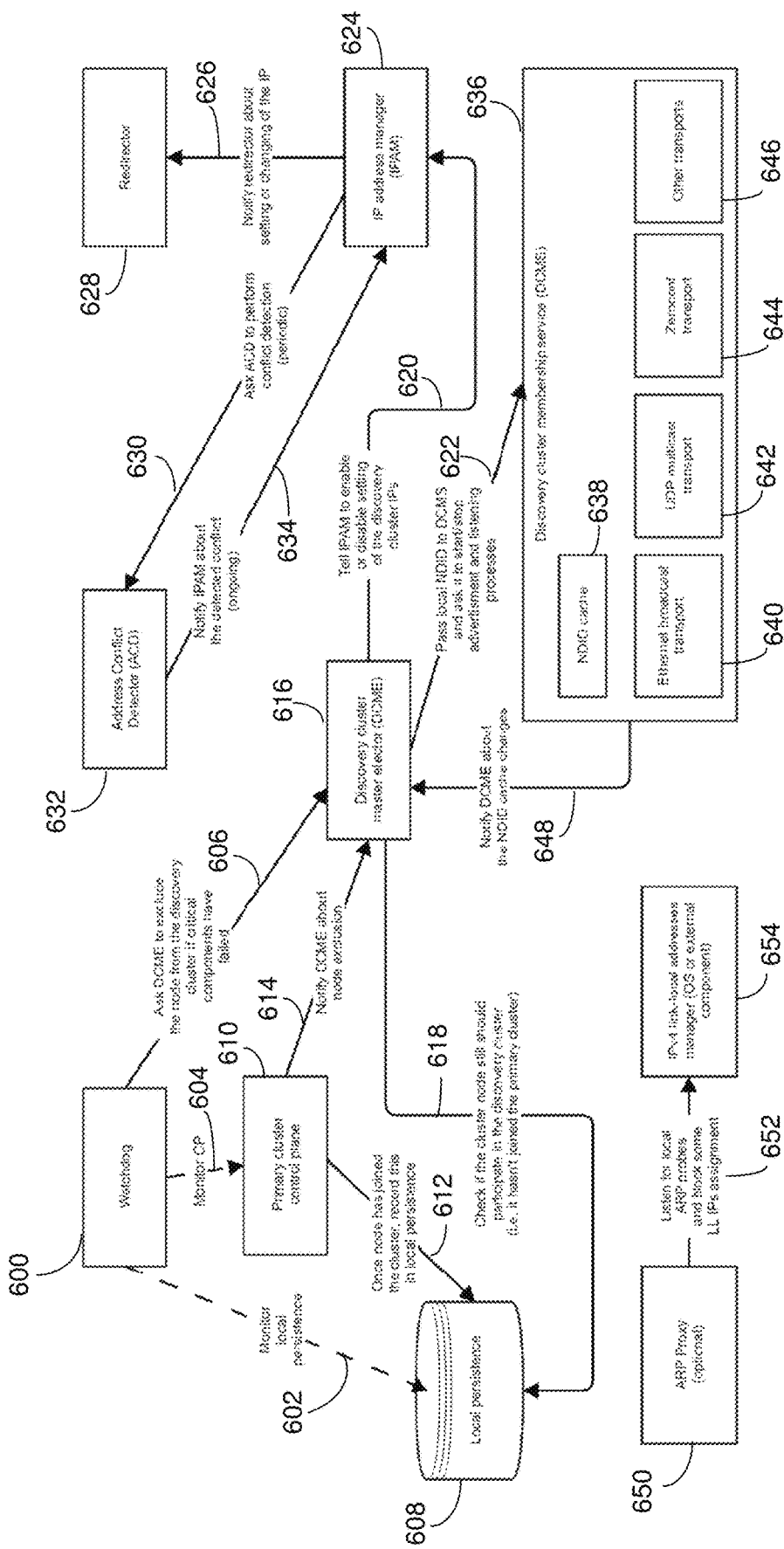
FIG. 6A is a block diagram of a network discovery system, in accordance with an embodiment of the present disclosure.

Further, in FIG. 6A, the software architecture of the cluster nodes is shown, in accordance with an embodiment of the present disclosure. A watchdog 600 may be included and may monitor 602 local persistence 608. Watchdog 600 may be responsible for monitoring the health of one or more components included within the software architecture. Alternatively, one or more of the components included within the software architecture may be reset by a timer of watchdog 600. The timer may be reset periodically. In the event one or more of the components included within the software architecture is non-responsive after an allotted amount of time has expired, watchdog 600 may reboot one or more of cluster nodes 300, 310, 320, and 330. Further, watchdog 600 may restart one or more of the components included within the software architecture. Specifically, watchdog 600 may restart a component of the one or more components included within the software architecture that is non-responsive after the allotted amount of time has expired. Further, watchdog 600 may be responsible for monitoring critical system components 604 in order to make sure that one or more of the cluster nodes (i.e. 300, 310, 320, 330) cannot endlessly hold a discovery IP address if some important components are not functional on the one or more of the cluster nodes (i.e. 300, 310, 320, 330). Watchdog 600 may also instruct 606 discovery cluster master elector (DCME) 616 to exclude a cluster node (i.e. 300, 310, 320, 330) from the discovery cluster (i.e. 500, 502, 504, 506) if the critical components fail.

In some embodiments, while monitoring the critical system components 604, primary cluster control plane 610, which refers to one or more of primary cluster control plane 302, 312, 322, 332, may notify 614 DCME 616 if one or more cluster nodes (i.e. 300, 310, 320, 330) have been excluded or not in order for DMCE 616 to exclude the node from the discovery cluster. Further, primary cluster control plane 610 may record 612 if an unconfigured primary cluster node (i.e. 302, 312, 322, 322) joins a primary cluster and the primary cluster becomes configured in local persistence 608. Specifically, if one or more of the cluster nodes (i.e. 300, 310, 320, 330) has joined the cluster, it may be recorded 612 to local persistence 608. Local persistence 608 may include a protected file, database, registry, etc. However, if the primary cluster node already records itself as being a member of a cluster, then recordation 612 in local persistence 608 may not be needed.

Further, if an unconfigured primary cluster node (i.e. 302, 312, 322, 322) joins the primary cluster and becomes configured, the discovery cluster may need to be notified in order for the unconfigured primary node (i.e. 302, 312, 322, 322) to immediately quit the discovery cluster. Allowing the unconfigured primary node (i.e. 302, 312, 322, 322) to quit the discovery cluster may be needed because the cluster floating well-known link-local IP addresses 506 can only occur on unconfigured nodes.

In some embodiments, DCME 616 may instruct 620 IP address manager (IPAM) 624 to enable or disable setting of the discovery cluster (i.e. 500, 502, 504, 508) IP addresses. In response, IPAM 624 may notify 626 redirector 628 about the setting or changing of the IP address instructions from DCME 616. Redirector 628 may be responsible for the transparent redirect from the cluster floating discovery IP address (i.e. cluster floating well-known link-local IP addresses 506) to the local link-local IP address (i.e. 326) configured on the cluster node (i.e. 320).

In some embodiments, IPAM 624 may also instruct 630 address conflict detector (ACD) 632 to perform conflict detection. IPAM 624 may be responsible for physically configuring and unconfiguring the discovery IP address on a master node and managing fallback to one or more secondary IP addresses if address conflicts are detected. The conflict detection may be periodic. ACD 632 may then notify 634 IPAM if there is a detected conflict of IP addresses. The detection may be continuous and ongoing. ACD 632 may be responsible for initial and ongoing address conflict detection in the network to ensure that a discovery IP address is not used by other hosts in the network. The address conflict detection may be fully automatic.

Figure 6B:
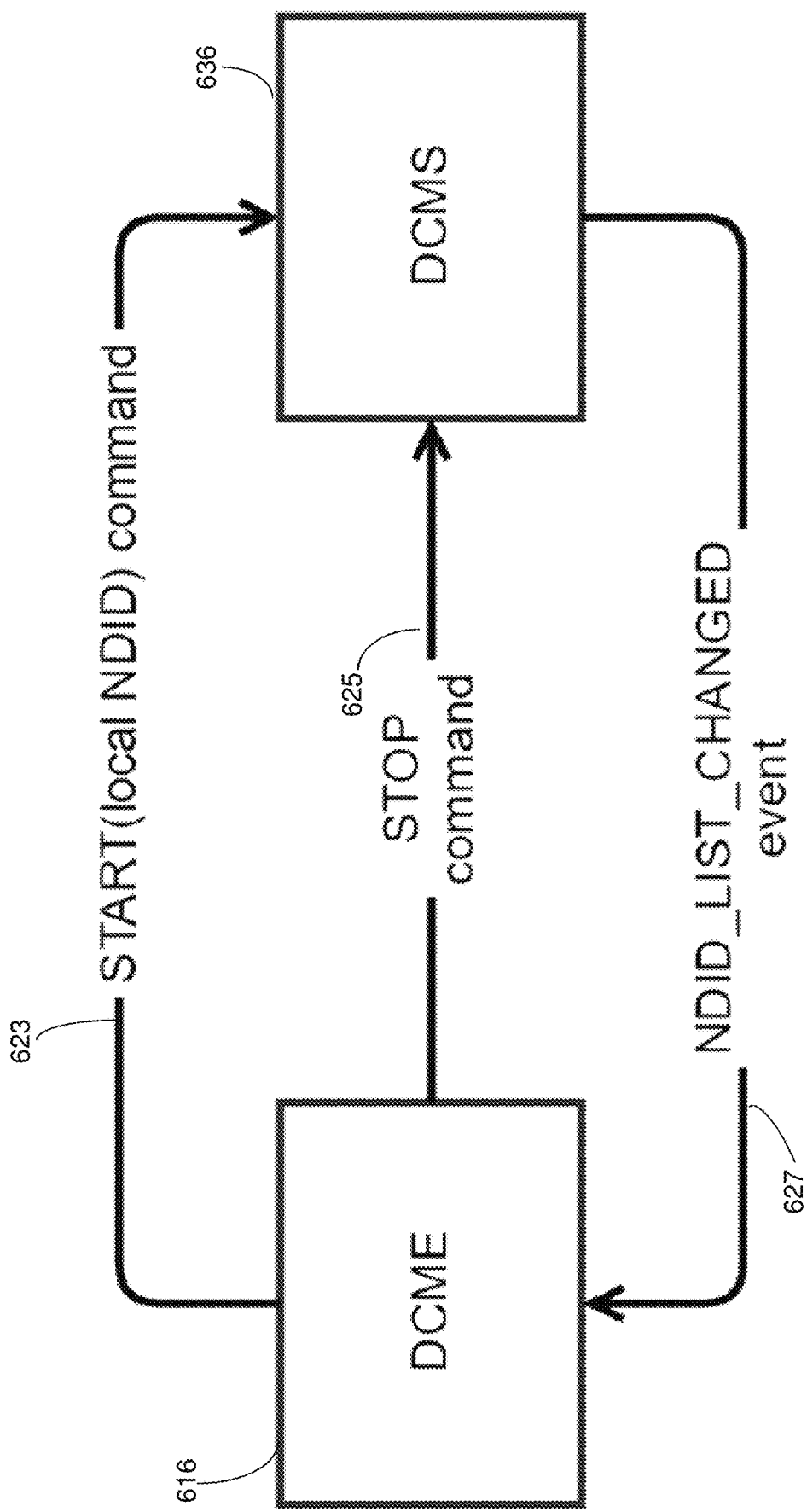
FIG. 6B is a block diagram of a network discovery system, in accordance with the embodiment of the present disclosure depicted in FIG. 6A.

In some embodiments, DCME 616 may pass 622 a local node discovery ID (NDID) to discovery cluster membership service (DCMS) 636. DCME 616 may be the key component of the discovery cluster control plane (i.e 500, 502, 504, 508). Further, DCME 616 may be responsible for making decision of whether a current node should be the master of the discovery cluster. DCME 616 may determine whether the current node should hold the discovery IP address. DCME 616 may be the only component to decide whether to change the state by configuring DCMS 636 with a local NDID by asking it to start or stop advertising and listening processes. For example, as shown in FIG. 6B, DCME 616 may ask DCMS 636 to start 623 or stop 625 one or more of advertisement and listening processes, as shown in FIG. 6B. In response, DCMS 636 may inform 627 DCME 616 of a NDID list change event (i.e. NDID_LIST-CHANGED event). DCMS 636 may inform 627 DCME 616 periodically. Further, DCME 616 may be capable of handling events from the primary cluster control plane (i.e. 302, 312, 322, 332), watchdog 600, and DCMS 636.

In some embodiments, DCMS 636 may support multiple transport types and may only communicate with DCME 616. DCMS 636 may include one or more of a NDID cache 638 of other cluster nodes, ethernet broadcast transport 640, user datagram protocol (UPD) multicast transport 642, Zeroconf transport 644, and other transports 646. In response to the NDID passed 622 by DCME 616, DCMS 636 may notify 648 DCME 616 about DCID cache changes, if applicable.

In some embodiments, DCMS 636 may advertise a local NDID. For example, it may advertise the local NDID every DCMS_ADV_INTERVAL milliseconds. The parameter may be configurable. DCMS 636 may send a notification to DCME 616 each time a new entry is added to or removed from the cache. The new entry may be added immediately after the packet is received from another cluster node. For example, the new entry may be added to a node has just been booted or broadcast domains have merged. However, the entry may be removed from NDID cache 638 if it was not updated during the last DCMS_SILENCE_THRESHOLD milliseconds. The removal of the entry may occur when a node goes down or network partitioning happens. Further, when a known NDID is received, the age of the NDID in the NDID cache 638 may be reset to zero. A sample DCMS 638 cache is shown below:

| Diagram 1 | |
|---|---|
| NDID of the remote cluster node | Age |
| SN777 | 40 ms |
| SN555 | 120 ms |
| SN333 | 2 ms |

Further, DCMS_SILENCE_THRESHOLD must be greater than DCMS_ADV_INTERVAL. Equation 1 demonstrates this rule:

DCMS_SILENCE_THRESHOLD>3*DCMS_ADV_INTERVAL  Equation 1

In this configuration, NDID cache 638 may be transport agnostic and may not depend on the communication protocol details. DCME 616 may only concern the list of known NDIDs and DCMS 636 may notify 648 DCME 616 about any changes in that list.

In some embodiments, the discovery cluster may be created automatically among all unconfigured nodes in an identical layer 2 broadcast domain. This may be unlike the primary cluster control plane, which must be explicitly created by an end user. Specifically, all unconfigured cluster nodes (i.e. 300, 310, 320, 330) may be considered identical and any of them may be elected as a master node. Further, it may be possible to introduce priorities based on hardware capabilities or software version on the cluster nodes. In terms of specific types of underlying transport used, the following may be used: (1) DCMS_B_ETH: Broadcast of raw Ethernet frames with dedicated Ethernet type; (2) DCMS_M_UDP: Multicast of UDP datagrams; and (3) DCMS_Z: Zeroconf based advertisement and discovery. DCMS 636 may support one or more transports. However, only one transport may need to be enabled at a time. In execution, DCMS 636 may periodically advertise local NDID encoded in a protocol data unit (PDU) encapsulated either in Ethernet frame or user datagram protocol datagram. The format of the PDU may be the same in both cases. DCMS 638 may listen either on a raw socket, looking for matching Ethernet type in incoming frames, or on a UDP port. The diagram below illustrates the format of DCMS_B_ETH and

| Diagram 2 | | | |
|---|---|---|---|
| DCMS_B_ETH packet | | | |
| Ethernet header | DCMS PDU | | |
| DCMS_M_UDP packet | | | |
| Ethernet header | IP header | UDP header | DCMS PDU |
| DCMS common PDU | | | |
| DCMS magic number | 4 bytes | | |
| DCMS version number | 2 bytes | | |
| NDID length in bytes | 2 bytes | | |
| NDID | Variable length (up to 2^16) | | |
| DCMS_M_UDP packets: | | | |

As can be seen in the above Diagram, DCMS 636 may contain one or more "magic numbers" to distinguish DCMS packets, version number for the future protocol enhancements and the NDID itself. The one or more magic numbers may include a fixed well-known sequence of bytes. For example, the fixed well-known sequence of bytes may be defined as one or more of 0xfedafeda and 0xdeadbeef. Further, the one or more magic numbers may be received into a header of the PDU where a receiver may validate the one or more magic numbers to ensure one or more correct network packets are received. In the event one or more PDUs are sent by mistake, ensuring that the one or more correct network packets are received allows for the one or more PDUs sent by mistake to be discarded.

However, the DCMS_Z: Zeroconf based advertisement and discovery type of underlying transport may work differently from the two above noted transport methods. Specifically, because clusters may already use Zeroconf, it may be possible to include a NDID in the definition of the service. If so, DCMS 636 may only need to perform the normal service discovery operation and extract the NDID from the obtained service definitions. Further, update of the DCMS cache (i.e. NDID cache 638) may be performed after each service discovery operation. A cache eviction may also be performed the same way based on the age of entries.

In some embodiments, the content of DCMS 636 PDUs may be optionally encrypted for the scenarios where cluster nodes are connected to an untrusted network and a malicious host is trying to affect the election of the master node by advertising the lowest possible NDID. The implementation of the encryption may be cluster system dependent (PSK based PDU encryption, transport mode IPsec encryption for IP based transports, etc.).

In some embodiments, DCME 616 may then check if one or more of the cluster nodes (i.e. 300, 310, 320, 330) should still participate in the discovery cluster (i.e. 500, 502, 504, 508). DCME 616 may make this determination by identifying that the one or more of the cluster nodes (i.e. 300, 310, 320, 330) have not joined the primary cluster.

In some embodiments, APR proxy 650 may also be included to guarantee the desired selection of IPv4 link-local IP addresses without modifying any standard components responsible for the automatic assignment. APR proxy 650 may be used to listen 652 for local APR probes and may block one or more link-local IP address assignments, which may in turn be sent to IPv4 link-local address manager 654. IPv4 link-local address manager 654 may use one or more of the operating system and an external component.

In some embodiments, a master cluster node may be determined. The master cluster node may be elected from N number of cluster nodes. For example, and not to be construed as a limitation, FIGS. 3-5 show four cluster nodes (i.e. 300, 310, 320, 330). Each node may have a unique value assigned to it in the form an NDID that may be advertised to all other nodes. The unique value may be implementation dependent. For example, stable values may include: (1) a serial number of a cluster node or its hardware component; and (2) a media access control address (MAC) address of the network interface on the cluster node.

In some embodiments, each node of the cluster (i.e. 300, 310, 320, 320) may know its own NDID and the NDID of any other reachable node. If the NDID of the node happens to be the numerically the lowest one, then the node may elect itself as a master of the discovery cluster. If the node that currently considers itself a master receives an NDID from some other node (e.g. a just booted node) which is lower than its own NDID, then it may immediately resigns the master role. Election of a new master node may occur in one or more of the following scenarios: (1) a node is booted; (2) a node goes down; (3) network partitioning occurs (i.e. a network switch has failed); (4) broadcast domains merge happened (e.g. a network switch is recovered from the failure); (5) a node has joined the primary cluster; and (6) a node has left the primary cluster.

Figure 7:
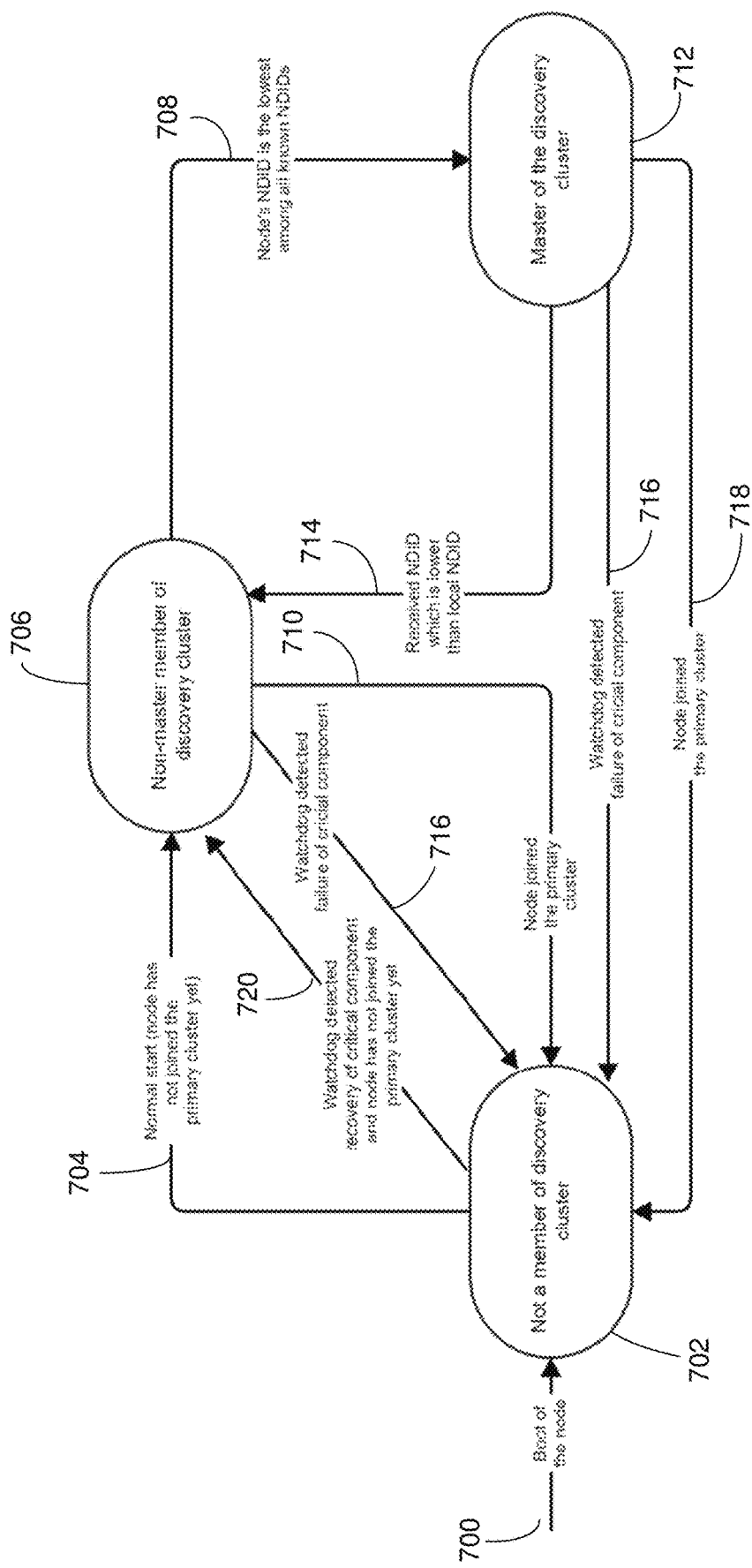
FIG. 7 is a block diagram of a network discovery system, according to an embodiment of the present disclosure.

Referring to FIG. 7, a state diagram for the node of the cluster (i.e. 300, 310, 320, 330) is provided. If a node of the cluster (i.e. 300, 310, 320, 330) is booted 700, it may not become 702 a member of the discovery cluster (i.e. secondary discovery cluster 500, 502, 504, 508). If the node of the cluster (i.e. 300, 310, 320, 330) has not joined the primary cluster yet, a normal start may occur 704 and the node may then become 706 a non-master member of the discovery cluster. Alternatively, if watchdog 600 determines 720 that the critical components have been recovered and the node has not yet joined the primary cluster yet, the node may then become 706 the non-master member of the discovery cluster. At this point, the node may either be detected 716 by watchdog 600 for failure of one or more critical components or the node may join 710 the primary cluster family.

Additionally, if the node is determined 706 to be the non-master member of the discovery cluster, the node's NDID may be identified 708 as the lowest among all known NDIDs. If so, the node may then be 712 the master of the discovery cluster. If a lower NDID, as compared to local NDIDs, is received 714, then the node may become 706 the non-master member of the discovery class. However, if watchdog 600 detects 716 failure of one or more critical component, the node then may not become 702 a member of the discovery cluster. Additionally, if the node joined 714 the primary cluster after being 712 master of the discovery cluster, the node then may not become 702 a member of the discovery cluster.

As a result of the teachings of the present disclosure, the backend Zeroconf network may be reliable where all transports supported by DCMS 636 may work and be used. Further, all transports may be enabled simultaneously and NDID cache 638 may be updated as well using NDIDs received via different protocols.

Further, in some embodiments, IPAM 624 may be responsible for management of the discovery IP address when the node is in the master role. For example, IPAM 624 may physically set the discovery IP address when a current node becomes a master. Alternatively, IPAM 624 may physically remove the discovery IP address when the current node regains the master role.

In some embodiments, if DCME 616 promotes the current node to the master role, it may delay actual configuration of the discovery IP address for DCME_DELAY milliseconds to give the prior or older master enough time to remove the discovery IP address to avoid unnecessary address conflicts. If a lower NDID is received during this time, then promotion to the master role may canceled.

In some embodiments, IPAM 624 may support simultaneous management of both IPv4 and IPv6 discovery addresses. IPv4 and IPv6 addresses may be handled fully independently and simultaneously and may be configured either directly on a physical network interface or on a virtual interfaces created on top of a shared physical interface depending on capabilities of the base OS. When the current node is not a master, no discovery addresses IP may be configured. When the current node is a master, then IPAM 624 may attempt to configure both IPv4 and IPv6 addresses. The attempt may fail if one or more IP address conflicts are detected.

In some embodiments, a chosen discovery IP address may already be in use by another host connected to the same broadcast domain. For example, this may occur when broadcast domains merge, which may lead to merging of two previously independent discovery clusters which could have used the same discovery IP addresses. Electing a master node may solve this problem, as only one master will remain and another one will resign the master role. Therefore, the discovery IP address may be removed. Additionally, an external host that is not a cluster node may have the same IP address as the discovery IP address. In this case, the discovery cluster may not be able to continue to use the discovery IP address. However, this issue may be solved by the fact that IPAM 624 may simultaneously support IPv4 and IPv6 discovery addresses for dual-stack client machines. Further, one or more fallback discovery IP addresses may also be included and tried in a round robin fashion if one or more address conflicts are detected. Because end users are supposed to connect to the well-known discovery IP address, the number of fallback IP addresses may not be large. Therefore, supporting up to two fallback addresses may be sufficient.

In some embodiments, the order of discovery IP addresses assignment must always be pre-defined. However, if a conflict has been detected for the first discovery address and the next address from the list has been successfully assigned, there may be no need to periodically check if the first discovery address no longer conflicts with other hosts in the network and configure it. If there was a conflict with an external host, then there may be a high chance that it the conflict may reoccur. The conflict with another cluster node may be unlikely because a new master node may delay the IP address assignment for a short period of time to allow the prior or old master to remove the discovery address. IPAM 624 may also delay the IP address removal in case of conflict notification from ACD 632 and may re-check the conflict before removing the IP address to handle merging of the discovery clusters.

In some embodiments, IPAM 624 may delegate the job of address conflict detection solely to ACD 632. Each time IPAM 624 needs to configure a new discovery IP address, it may first asks ACD 632 to check if it's not in use. If ACD 632 detects the conflict, then IPAM 624 may try another discovery IP address from a fallback list. If all discovery IP addresses are in use by some external hosts in the network, then IPAM 624 may not configure the IP addresses from the fallback list and may repeat the check every ACD_RETRY_INTERVAL milliseconds. This parameter may be configurable.

Figure 8:
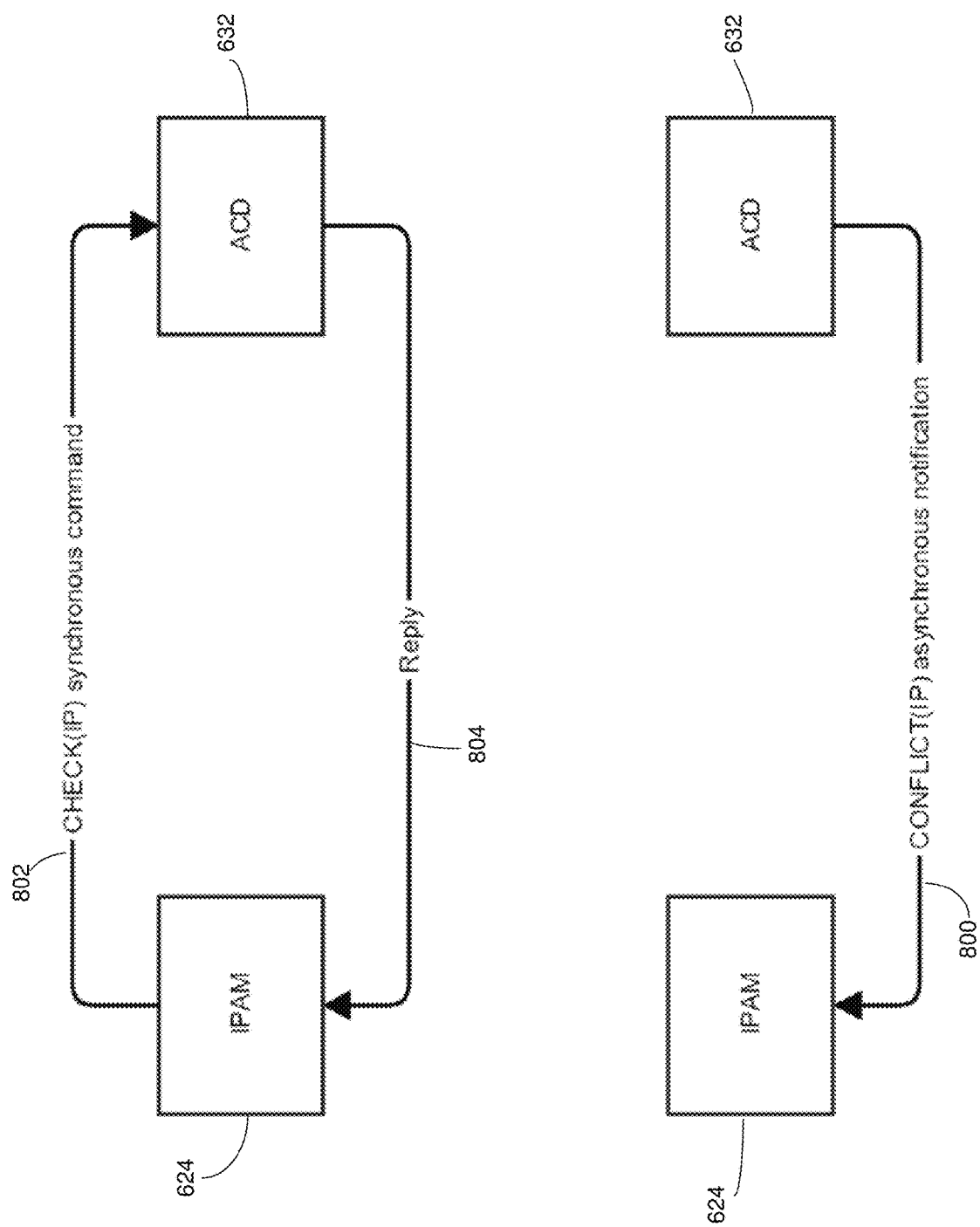
FIG. 8 is a block diagram of a network discovery system, in accordance with an embodiment of the present disclosure.

In some embodiments, and as shown in FIG. 8, even if ACD 632 does not detect an address conflict and IPAM 624 successfully configures the discovery IP address, it does not mean that the conflict may not happen later on. ACD 632 may keep track of address conflicts for the configured discovery addresses and may asynchronously notify 800 IPAM 624 about any conflicts. If the conflict is detected, IPAM 624 may remove the discovery IP and may try one of the fallback addresses. In order to avoid unnecessary discovery address changes in case two discovery clusters merge due to the merge of the broadcast domains, IPAM 624 may delay the removal of the discovery IP address for IPAM_DELAY milliseconds, send a synchronous CHECK command 802 to ACD 632 again and may only remove the IP address if it confirms the conflict in ACD's 632 reply 804 to IPAM 624. Further, ACD 632 may implement address conflict detection via address resolution protocol (ARP) for IPv4 and NDP for IPv6 using standard mechanisms documented in IETF RFC 5227 and RFC 4862.

In some embodiments, IPv4 link-local discovery addresses may be selected. In general, IPv4 link-local addresses may use a reserved subnet 169.254.0.0/16 (RFC 3927). The addresses may be automatically generated using a pseudo-random number generator with uniform distribution. Currently, there are only 216 unique addresses and the probability of address conflicts is relatively high. As a result, the standard defines an explicit "claim and defend" mechanism based on address conflict detection.

According to the standard, the beginning and the end of IPv4 link-local address range are excluded from the automatic address assignment scheme, since the standard excludes the first and the last 256 addresses. It is proposed to use 169.254.0.0/24 subnet for the selection of discovery IP addresses and choose N discovery IP addresses from it, e.g. for N=3 we may select the following discovery I addresses:

| Diagram 3 |
| --- |
| IPv4 link-local discovery IP |
| 169.254.0.80/16 |
| 169.254.0.160/16 |
| 169.254.0.240/16 |

As shown in the diagram above, the reserved address ranges in IPv4 link-local subnet 169.254.0.0/16 are not currently used by any protocols or systems. Because the entire subnet is allocated for link-local use-cases and is not routable, it may be safe to use the reserved IP addresses for link-local cluster discovery. The probability of address conflicts with external hosts may be very low and ACD 632 will may make sure that discovery IP address is never assigned if the conflict is detected. As a result, no additional IP subnets beyond already used one may be required. Moreover, for simple client machines with automatic link-local IP address configured on the only network interface, no additional configuration may be needed on the client side for communication with the discovery IP address.

In some embodiments, IPv6 link-local addresses may be used. In general, IPv6 link-local addresses have common prefix fe80::/10 and use 64-bit interface identifiers. Interface identifiers are usually derived from MAC addresses (modified EUI-64 format) or randomly generated. In order to minimize the chance of address conflicts, the interface identifiers for IPv6 discovery addresses may be selected as follows: (1) the first 24 bits are always occupied by organizational unique identifier (OUI) of the vendor; or (2) the last 40 bits are assigned by OUI owner. In this second scenario, there are two options. First, the first 16 bits may be set to 0xfffe and the last 24 bits are reserved for the discovery address and are not assigned for any other purposes. Second, 40 bits may be reserved for the discovery address and are not assigned for any other purposes.

In some embodiments, one or more link-local IP addresses may be assigned to one or more of the first cluster and the second cluster. Assigning one or more link-local IP addresses may minimize the risk of an IP address conflict.

As a result, this approach may minimize the risk of address conflicts in a user's network because discovery addresses are supposed to be unique within the OUI scope. All cluster nodes of the same type must use the same discovery addresses and master election algorithm guarantees that there will be only one address configured at any moment. Below is an example of three IPv6 discovery addresses generated this way.

| Diagram 4 |
| --- |
| IPv6 link-local discovery IP |
| fe80::0201:4400:dell:dell/64 |
| fe80::0201:4401:dell:dell/64 |
| fe80::0201:44ff:fe00:dell/64 |

In some embodiments, if an external host configures the same interface identifier (i.e. by generating a random 64-bit value which happens to be the same), then ACD 632 may detect this and IPAM 624 may try another discovery IP.

Particularly, this approach may work well on any IPv6 or dual-stack client machine with a single network interface. If the client machine has multiple network interfaces, for example, then cluster discovery may work from any browser compatible with RFC 6874 or supporting a non-standard way to specifying zone identifier for the IPv6 link-local address. No configuration on the client side may be needed for those scenarios.

In another embodiment, one or more client machines may include one or more of a single-stack client machine and a dual-stack client machine.

Further, in another embodiment, one or more client machines may include a multi-homed client machine.

In yet another embodiment, the first cluster node and the second cluster node may be discovered via one or more of an IPv4 and an IPv6 link-local discovery address.

In another embodiment, the first cluster node and the second cluster node may be discovered using one or more IPv6 ULA discovery addresses.

Further, network discovery process 10 may support both single-stack and dual-stack client machines while allowing cluster nodes to be discovered via IPv4 and IPv6 well-known discovery IP addresses. In addition to link-local IPv6 discovery addresses, the solution simultaneously supports one or more unique local addresses (ULAs) discovery addresses which allow overcoming limitations in existing web browsers that do not support standard or non-standard way of specifying the IPv6 zone identifiers on multi-homed client machines.

In some embodiments, unique local addresses (ULA, RFC 4291) may be used as discovery addresses in addition to normal IPv6 link-local addresses. This is an alternative to the common approach, as many browsers do not properly support zone identifiers in the uniform resource identifier (URI). In order to solve this issue, the solution proposes to use unique local addresses (ULA, RFC 4291) as discovery addresses in addition to normal IPv6 link-local addresses.

ULAs may use reserved prefix fc00::/7 and the diagram below show how ULAs may be structured. The "L" bit must be set to 1 to indicate that IP address is locally assigned, as illustrated in the diagram below.

| Diagram 5 | | | | |
|---|---|---|---|---|
| 7 bits | 1 | 40 bits | 16 bits | 64 bits |
| Prefix | L | Global ID | Subnet ID | Interface ID |

According to Request for Comments ("RFC") 4291, for unicast IPs, the interface ID may be 64 bits long and may be based on modified EUI-64 format (mEUI-64). The first part of the process may generate the EUI-64. This may include an official 24-bit organizationally unique identifier ("OUI") value registered for the storage system vendor (http://standardsoui.ieee.org/oui.txt). This value may occupy the first 24 bits. The remaining 40 bits may be generated based on some unique stable values available for the storage appliance or storage controller in the storage cluster.

In some embodiments, it may be possible to generate the remaining 40 bits of EUI-64 using the following approach. The process may obtain the current time in 64-bit NTP format defined in RFC 1305 (denoted as T). This time format may be required later for ULA Global ID generation, so it may be reused for the EUI-64 generation as well. The process may obtain a serial number of one or more storage appliances or another unique identifier (denoted as S) and obtain the storage system-specific purpose as follows (denoted as P).

In some embodiments, the Global ID may be generated according to RFC 4193 rules. This may include obtaining the current time in 64-bit NTP format (denoted as T), obtaining the EUI-64 identifier (denoted as E), calculating 160 bit SHA-1 of concatenated T+E, and using the least significant 40 bits of SHA-1 as the Global ID.

Further, the EUI-64 identifier discussed above may be the same as EUI-64 of the first link-local IPv6 discovery IP or any other EUI-64. The diagram below includes examples of three IPv6 ULA discovery addresses generated this way.

| Diagram 6 |
|---|
| IPv6 ULA discovery IP |
| fdf2:11ec:cc6c:0000:0201:4400:dell:dell/64 |
| fdf2:11ec:cc6c:0000:0201:4401:dell:dell/64 |
| fdf2:11ec:cc6c:0000:0201:44ff:fe00:dell/64 |

Additionally, handling of address conflicts for ULA discovery addresses may be similar to link-local discovery addresses. In order to access the discovery IP address from the client machine, a user may need to configure local IPv6 address from the same/64 prefix on the interface connected to the cluster network. The discovery may work via any IPv6 capable browser because ULA addresses do not require zone identifiers. Optionally, IPAM 624 on the master node may advertise the ULA prefix so that a client machine may configure the local ULA address automatically if a stateless address autoconfiguration (SLAAC) feature is enabled.

In some embodiments, communication between the client machine and the cluster node may be initiated via the discovery IP address and then immediately and transparently switched to the link-local IP address of the cluster node itself. In this configuration, the discovery IP address may be the well-known entry point to the primary cluster node. Further, the discovery IP address may be removed right after the node has joined the primary cluster. As a result, the communication with the cluster via discovery IP address may suddenly fail and the user may not be able to access the configured primary cluster without reconfiguring the client machine and reconnecting to the cluster via the public management IP address.

Figure 9:
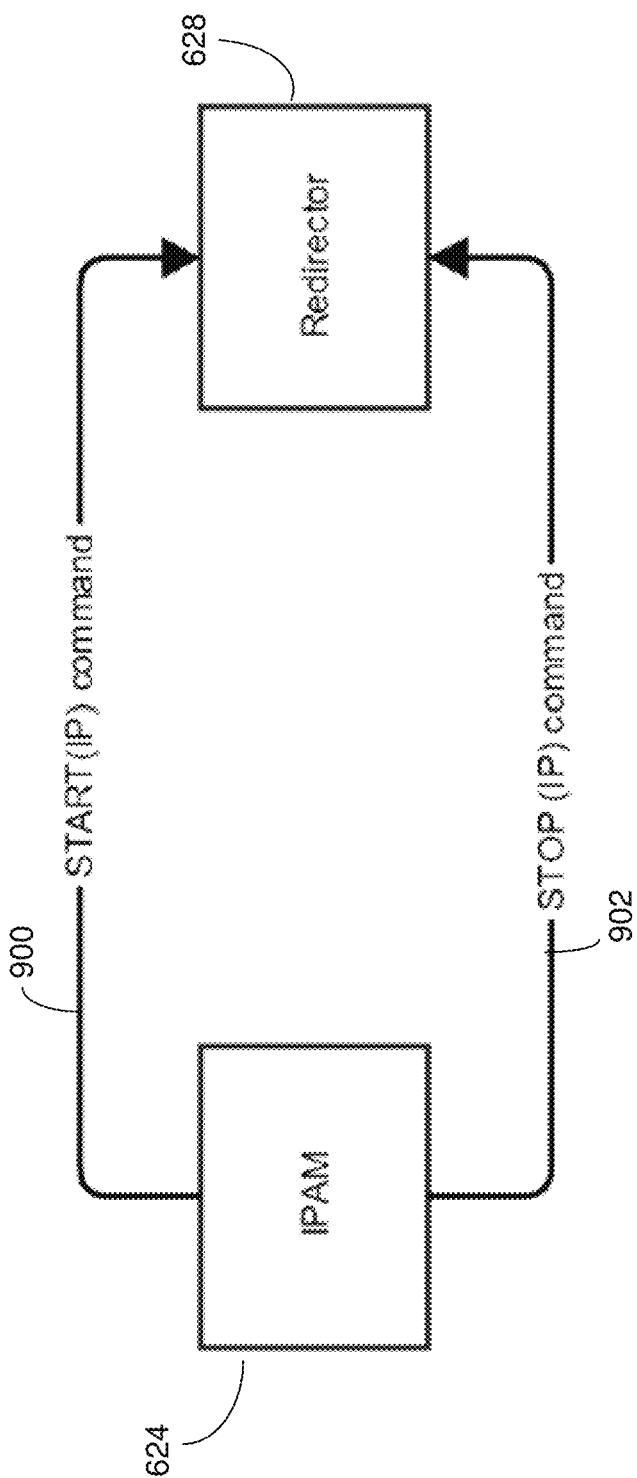
FIG. 9 is a block diagram of a network discovery system, in accordance with an embodiment of the present disclosure.

In some embodiments, and as shown in FIG. 9, IPAM 624 may send a start 900 command or a stop 902 command for each discovery IP address it manages to redirector 628. Redirector 628 may implement a simple HTTP->HTTP(s) redirection via HTTP protocol. As a result, all communication with the primary cluster control plane may occur via the link-local IP address of the node, which is demonstrated in FIG. 10.

Figure 10:
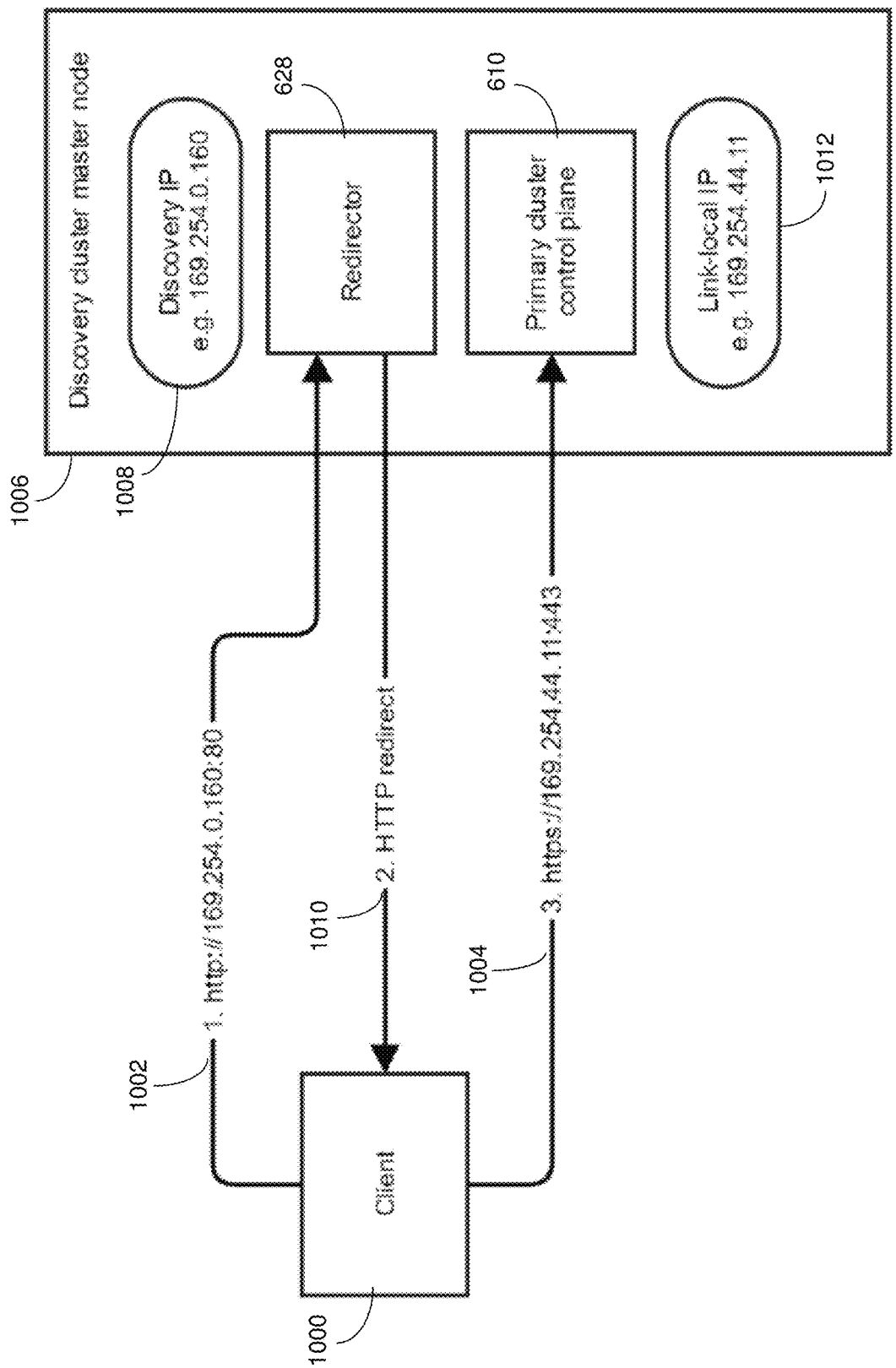
FIG. 10 is a block diagram of a network discovery system, in accordance with an embodiment of the present disclosure.

In some embodiments, and as shown in FIG. 10, client 1000 may communicate 1002 with redirector 628, which may be located in discovery cluster master node 1006, via http://169.254.0.160:80. Redirector 628 may also communicate directly 1010 with client 1000. The client may also communicate 1004 with primary cluster control plane 610, which may also be located in discovery cluster master node 1006, via https://169.254.44.11:443. Discovery cluster master node 1006 may also include a discovery IP address 1008. For example, the discovery IP address may be 169.254.0.160. Further, discovery cluster master node 1006 may also include link-local IP address 1012. Link-local IP address 1012 may be, for example, 169.254.44.11.

In some embodiments, in order to be able to create multiple primary clusters simultaneously, the primary cluster control plane may need to allow a user to select any cluster node discovered via the backend Zeroconf network and redirect to that node using its link-local IP address advertised via Zeroconf service discovery. As a result, single or multiple users may be allowed to simultaneously connect to different cluster nodes and create multiple independent primary clusters. The discovery IP address may automatically failover to another member of the discovery cluster once one or more nodes join the primary clusters. However, the failover may not affect the creation of the primary cluster. If IPv6 ULA discovery addresses are enabled in IPAM configuration, then IPAM 624 may also configure one or more ULA addresses for each node. Those addresses must be from common ULA discovery subnet, but interface identifiers may be generated using any mechanism (derived from MAC via modified EUI-64 or generated randomly). If IPv6 DAD detects an address conflict for such addresses, the interface identifier may be immediately re-generated by IPAM 624 and IPAM 624 may notify redirector 628. In execution, redirector 628 may redirect one or more of the following: (1) an IPv4 link-local cluster floating discovery address to the local link-local IPv4 node address; (2) an IPv6 link-local cluster floating discovery address to the local link-local IPv6 node address; and (3) an IPv6 ULA cluster floating discovery address to the local ULA IPv6 node address.

In some embodiments, an IP address may be manually assigned in attempt to simplify access to the discovery IP address and link-local addresses configured on the cluster nodes (i.e. 300, 310, 320, 330). The IP address may be selected from the 169.254.0.1-169.254.0.254 range of/17 subnet and not the/16 subnet range. Specifically, a user may assign an IP address from that range that is not used by the cluster discovery IP address and by external hosts in the user's network. This approach may work for communication with discovery IP addresses but may fail for the communication with about one-half of IPv4 link-local addresses because the client may have one or more IP addresses in the narrower subnet. To remedy this, it is proposed to change the way IPv4 link-local addresses are assigned on the cluster nodes. The first option is to change the component which manages the assignment of the addresses. Because IPv4 link-local addresses are generated pseudo-randomly, the 16-bit random number may be modified as follows:

$$n = n \& 0x7fff \qquad \text{Equation 2}$$

And generate a new random number until the following condition is true $$n \& 0x7fff\,! = 0x7fff \qquad \text{Equation 3}$$

As a result of the above technique, any link-local address generated on the cluster node may be ensured to be directly reachable from the client configured with a link-local address from 169.254.0.0/17 subnet while the link-local addresses on the cluster nodes may be from 169.254.0.0/16 subnet.

In some embodiments, where the above approach is not applicable (i.e. it may not be possible to change the component which assigns the link-local addresses in scenarios where addresses are assigned by the base OS itself). Instead, two alternative mechanisms may be based on ARP proxy 650. In this embodiment, when the OS assigns the link-local address, it may first have to check if the link-local address is not in use. The ARP proxy component running on the same cluster node may be configured to do one or more of the following: (1) read all ARP probe packets from the network interface; (2) if a source MAC is not a local one, then the packet may be skipped; and (3) if the ARP probe is for an address from 169.254.128.0/17 subnet or for 169.254.127.255, then a fake ARP reply may be replied with; and (4) if not, the packet may be skipped. When the OS receives the ARP reply, it may have to select another address using a newly generated random number according to the standard. As a result, only addresses from 169.254.0.0/17 subnet (excluding the broadcast address) may be allowed, which may be directly reachable from the client machine.

Figure 11:
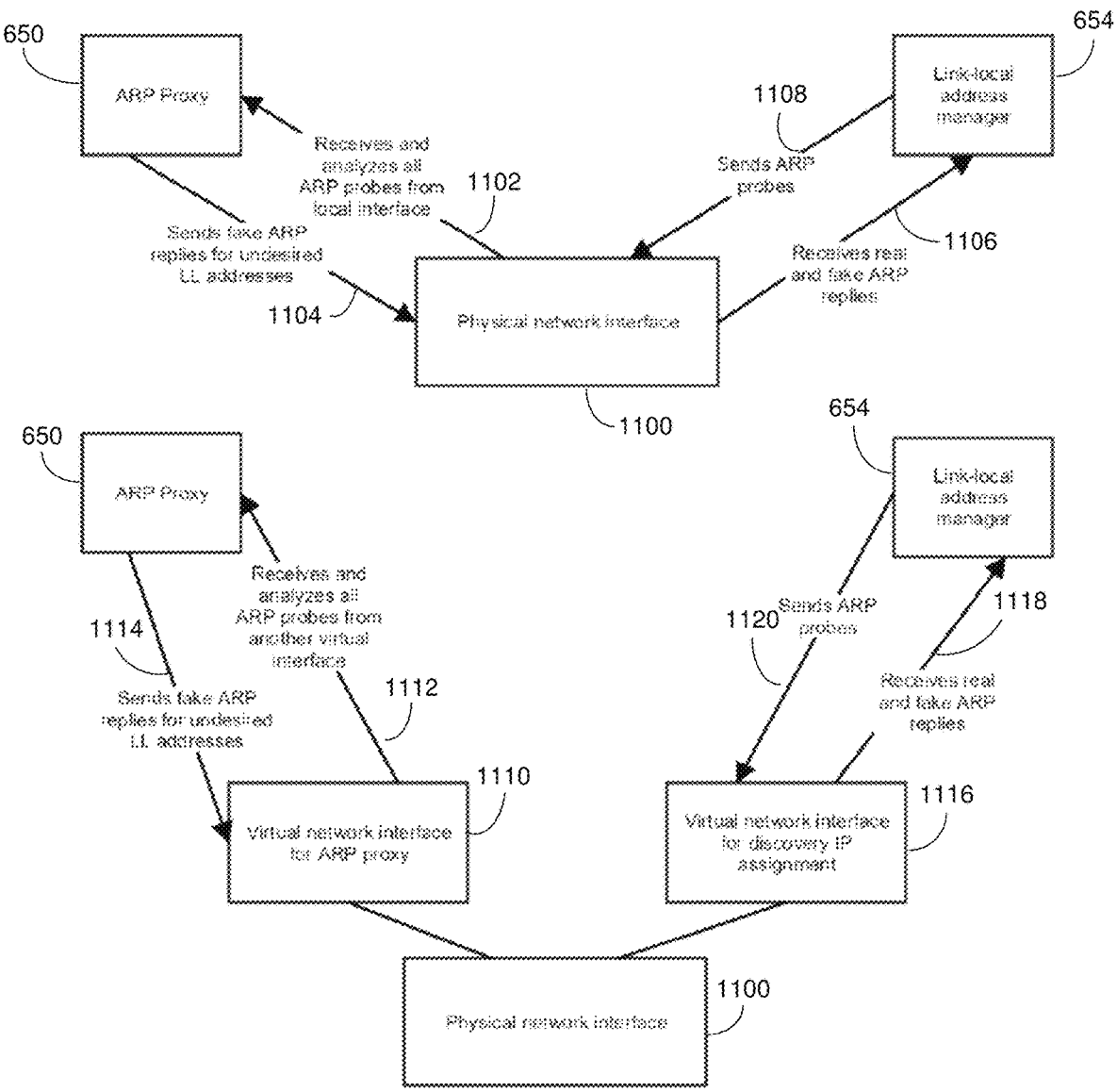
FIG. 11 is a block diagram of a network discovery system, in accordance with an embodiment of the present disclosure.

Referring to FIG. 11, it may be possible to use a single network interface or create two virtual network interfaces on top of it—one for link-local address assignment and ARP probes and another for listening for ARP probes and sending fake ARP replies, depending on the OS configuration. Specifically, APR proxy 650 may receive and analyze 1102 all ARP probes from local interface from physical network interface 1100. In return, ARP proxy 650 may send 1104 one or more fake ARP replies for undesired link-local IP addresses. Further, link-local address manager 654 may receive 1106 real and/or fake ARP replies from physical network interface 1100. In response, link-local address manager 654 may send 1108 ARP probes to physical network interface 1100.

As shown in FIG. 11, physical network interface 1100 may interact with a virtual network interface for ARP proxy 1110. ARP Proxy 650 may receive and analyze 1112 all ARP probes from another virtual interface from virtual network interface for ARP proxy 1110. In return, ARP Proxy 650 may send 1114 one or more fake ARP relies for undesired link-local IP addresses. Further, physical network interface 1100 may interact with virtual network interface for discovery IP address assignment 1116. Link-local address manager 654 may receive 1118 real and/or fake ARP replies from virtual network interface for discovery IP address assignment 1116. In return, link-local address manager 654 may send 1120 one or more ARP probes to virtual network interface for discovery IP address assignment 1116.

Further, it will be appreciated that the above described mechanisms of network discovery process 10 may work to correct interface selection on multi-homed client machines without requiring any non-standard configuration (i.e. changing routing tables on the client side). Network discovery process 10 may naturally support multi-homed client machines via a new way of link-local IP addresses selection.

In some embodiments, network discovery process 10 may completely eliminate the need for a Zeroconf service discovery stack on a client's side and hence does not require any non-standard multicast based tools. The discovery of the cluster nodes may work via a standard web browser and unicast communication. It may not require any manual network configuration on the client's side for the most common scenarios. In more complex scenarios, it may only require a simple and standard network configuration procedure on the client machine without the need to customize the OS configuration and/or disable any system software. Further, no significant changes to the existing primary cluster software stack may be required. Network discovery process 10 can be easily integrated into any clustered system based on Zeroconf.

In some embodiments, network discovery process 10 may provide a native cluster aware experience and allows to configure multiple clusters at the same time from the same or different client machines without artificial segregation of the cluster nodes.

In some embodiments, network discovery process 10 may allow for seamless access to the configured cluster via the discovery network without the need to configure multiple addresses on the client machine or reconnecting the client machine to a different network or VLAN.

In some embodiments, network discovery process 10 may allow for the use of the discovery cluster running on the same cluster node as the primary cluster while managing the cluster floating well-known floating discovery IP addresses. Further, the IP address of the discovery cluster may be explicitly redirected from the IP address of the cluster node, which may allow for the creation of one or more clusters simultaneously while also allowing seamless access to the configured cluster without requiring network reconfiguration on the client's side.

In some embodiments, network discovery process 10 may also predictably select a correct network interface on one or more multi-homed client machines without requiring changes to the link-local IPv4 address assigned on the cluster side.

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method for supplementary network discovery of one or more zero-configuration-based clustered systems comprising:
   providing, via one or more client machines, at least a first cluster node and a second cluster node, wherein the first cluster node and the second cluster node are configured to be connected to a local-area network, wherein each of the first cluster node and the second cluster node include at least one of a link-local internet protocol (IP) address, a primary cluster and a secondary cluster;
   including one or more floating link-local IP addresses within the secondary cluster, wherein the one or more floating link-local IP addresses allow a user to access the secondary cluster;
   providing, via one or more client machines, a discovery host configured to be connected to the local-area network, wherein the discovery host includes a web browser and is configured to communicate with the first cluster node and the second cluster node via a unicast communication without requiring a zero-configuration service discovery stack;
   configuring the first cluster node and the second cluster node concurrently, wherein configuring the first cluster node and the second cluster node concurrently does not require artificial segregation of the first cluster node from the second cluster node; and
   detecting an IP address conflict between one or more of the link-local IP address of the first cluster, the link-local IP address of the second cluster, and the one or more floating link-local IP addresses of the secondary cluster.

2. The computer-implemented method of claim 1, further comprising assigning one or more link-local IP addresses to one or more of the first cluster and the second cluster, wherein assigning one or more link-local IP addresses minimizes the risk of an IP address conflict.

3. The computer-implemented method of claim 1, wherein the one or more client machines include one or more of a single-stack client machine and a dual-stack client machine.

4. The computer-implemented method of claim 1, wherein the one or more client machines include a multi-homed client machine.

5. The computer-implemented method of claim 1, wherein the first cluster node and the second cluster node are discovered via one or more of an IPv4 and an IPv6 link-local discovery address.

6. The computer-implemented method of claim 1, wherein the first cluster node and the second cluster node are discovered using one or more IPv6 ULA discovery addresses.

7. The computer-implemented method of claim 1, wherein the local-area network is comprised of a network configuration that does not require one or more of customization of an operating system and disablement of system software.

8. A computing system including a processor and a memory system configured to perform operations comprising:
   providing, via one or more client machines, at least a first cluster node and a second cluster node, wherein the first cluster node and the second cluster node are configured to be connected to a local-area network, wherein each of the first cluster node and the second cluster node include at least one of a link-local internet protocol (IP) address, a primary cluster and a secondary cluster;
   including one or more floating link-local IP addresses within the secondary cluster, wherein the one or more floating link-local IP addresses allow a user to access the secondary cluster;
   providing, via one or more client machines, a discovery host configured to be connected to the local-area network, wherein the discovery host includes a web browser and is configured to communicate with the first cluster node and the second cluster node via a unicast communication without requiring a zero-configuration service discovery stack;
   configuring the first cluster node and the second cluster node concurrently, wherein configuring the first cluster node and the second cluster node concurrently does not require artificial segregation of the first cluster node from the second cluster node; and
   detecting an IP address conflict between one or more of the link-local IP address of the first cluster, the link-local IP address of the second cluster, and the one or more floating link-local IP addresses of the secondary cluster.

9. The computing system of claim 8, further comprising assigning one or more link-local IP addresses to one or more of the first cluster and the second cluster, wherein assigning one or more link-local IP addresses minimizes the risk of an IP address conflict.

10. The computing system of claim 8, wherein the one or more client machines include one or more of a single-stack client machine and a dual-stack client machine.

11. The computing system of claim 8, wherein the one or more client machines include a multi-homed client machine.

12. The computing system of claim 8, wherein the first cluster node and the second cluster node are discovered via one or more of an IPv4 and an IPv6 link-local discovery address.

13. The computing system of claim 8, wherein the first cluster node and the second cluster node are discovered using one or more IPv6 ULA discovery addresses.

14. The computing system of claim 8, wherein the local-area network is comprised of a network configuration that does not require one or more of customization of an operating system and disablement of system software.

15. A computer program product comprising a non-transitory computer readable storage medium having a plurality of instructions stored thereon, which, when executed by a processor, cause the processor to perform operations including:
providing, via one or more client machines, at least a first cluster node and a second cluster node, wherein the first cluster node and the second cluster node are configured to be connected to a local-area network, wherein each of the first cluster node and the second cluster node include at least one of a link-local internet protocol (IP) address, a primary cluster and a secondary cluster;
including one or more floating link-local IP addresses within the secondary cluster, wherein the one or more floating link-local IP addresses allow a user to access the secondary cluster;
providing, via one or more client machines, a discovery host configured to be connected to the local-area network, wherein the discovery host includes a web browser and is configured to communicate with the first cluster node and the second cluster node via a unicast communication without requiring a zero-configuration service discovery stack;
configuring the first cluster node and the second cluster node concurrently, wherein configuring the first cluster node and the second cluster node concurrently does not require artificial segregation of the first cluster node from the second cluster node; and
detecting an IP address conflict between one or more of the link-local IP address of the first cluster, the link-local IP address of the second cluster, and the one or more floating link-local IP addresses of the secondary cluster.

16. The computer program product of claim 15, wherein the operations further comprising assigning one or more link-local IP addresses to one or more of the first cluster and the second cluster, wherein assigning one or more link-local IP addresses minimizes the risk of an IP address conflict.

17. The computer program product of claim 15, wherein the one or more client machines include one or more of a single-stack client machine and a dual-stack client machine.

18. The computer program product of claim 15, wherein the one or more client machines include a multi-homed client machine.

19. The computer program product of claim 15, wherein the first cluster node and the second cluster node are discovered via one or more of an IPv4 and an IPv6 link-local discovery address.

20. The computer program product of claim 15, wherein the first cluster node and the second cluster node are discovered using one or more IPv6 ULA discovery addresses.

* * * * *